(12) United States Patent
Morita

(10) Patent No.: US 10,097,700 B2
(45) Date of Patent: Oct. 9, 2018

(54) FACSIMILE APPARATUS AND METHOD FOR CONTROLLING THE SAME TO PREVENT MISTAKEN TRANSMISSION

(71) Applicant: CANON KABUSHIKI KAISHA, Tokyo (JP)

(72) Inventor: Hiroyasu Morita, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/325,033

(22) Filed: Jul. 7, 2014

(65) Prior Publication Data

US 2015/0022867 A1      Jan. 22, 2015

(30) Foreign Application Priority Data

Jul. 17, 2013   (JP) .................................. 2013-148832

(51) Int. Cl.
*G06F 15/00*      (2006.01)
*H04N 1/00*       (2006.01)

(52) U.S. Cl.
CPC ......... *H04N 1/0001* (2013.01); *H04N 1/0022* (2013.01); *H04N 1/00217* (2013.01);
(Continued)

(58) Field of Classification Search
CPC ........... H04N 1/00214; H04N 1/00352; H04N 1/32096; H04N 1/32085; H04N 1/321117;
(Continued)

(56) References Cited

U.S. PATENT DOCUMENTS

| 7,710,589 B2 * | 5/2010 | Sodeura | H04N 1/00209 |
| | | | 358/1.12 |
| 7,965,423 B2 * | 6/2011 | Glunz | H04N 1/00217 |
| | | | 358/1.15 |

(Continued)

FOREIGN PATENT DOCUMENTS

| CN | 1435035 | 8/2003 |
| CN | 103095950 | 5/2013 |

(Continued)

OTHER PUBLICATIONS

Great Britain Search Report dated Dec. 10, 2014 in counterpart Great Britain Patent Application No. GB 1412723.7.

(Continued)

*Primary Examiner* — Mark R Milia
(74) *Attorney, Agent, or Firm* — Fitzpatrick, Cella, Harper & Scinto

(57) ABSTRACT

The present facsimile apparatus accepts inputs of a destination of facsimile transmission and a communication network to be used for the facsimile transmission, and further accepts re-entry of the destination and the communication network. The facsimile apparatus is controlled so as to execute the facsimile transmission if both the first input destination and communication network match the re-entered destination and communication network, and so as not to execute the facsimile transmission if at least one of the first input and accepted destination and communication network does not match the re-entered and accepted destination and communication network.

9 Claims, 13 Drawing Sheets

(52) U.S. Cl.
CPC ..... *H04N 1/00411* (2013.01); *H04N 1/00472* (2013.01); *H04N 1/00482* (2013.01); *H04N 1/00474* (2013.01); *H04N 2201/0094* (2013.01); *H04N 2201/0098* (2013.01)

(58) Field of Classification Search
CPC ............. H04N 1/0035; H04N 1/32646; H04N 1/32609; H04N 1/32683; H04N 1/32641; H04N 2201/0093; H04N 1/00962; H04N 1/32037; H04N 1/32529; H04N 1/32534; H04N 1/0022; H04N 1/0411; H04N 1/001; H04N 1/00217; H04N 1/00411; H04N 1/00472; H04N 1/00482; H04M 1/347; H04M 1/2477; H04M 1/738; H04M 11/06; H04M 11/066
USPC ......................................................... 358/405
See application file for complete search history.

(56) References Cited

U.S. PATENT DOCUMENTS

| | | | | |
|---|---|---|---|---|
| 8,094,792 B2* | 1/2012 | Sayama | ............... | H04M 11/066 358/1.1 |
| 8,208,155 B2* | 6/2012 | Shouno | .................. | G06K 15/00 358/1.15 |
| 8,724,144 B2* | 5/2014 | Tonegawa | ............ | H04N 1/4406 358/1.15 |
| 8,867,078 B2 | 10/2014 | Tobinaga | ................ | G06F 7/582 |
| 2004/0047342 A1* | 3/2004 | Gavish | ................ | H04L 12/1813 370/352 |
| 2006/0262343 A1* | 11/2006 | Kikuchi | ............. | H04N 1/32609 358/1.15 |
| 2007/0133765 A1* | 6/2007 | Sayama | ............. | H04N 1/00962 379/100.01 |
| 2010/0027058 A1* | 2/2010 | Okada | ................ | H04N 1/00209 358/1.15 |
| 2011/0043867 A1* | 2/2011 | Tonegawa | ............ | H04N 1/4406 358/442 |
| 2013/0107321 A1* | 5/2013 | Tobinaga | ................ | H04M 1/26 358/1.15 |

FOREIGN PATENT DOCUMENTS

| | | |
|---|---|---|
| JP | 02-200058 | 8/1990 |
| JP | 2009-224999 | 10/2009 |
| JP | 2010-130515 | 6/2010 |
| JP | 2010-178037 | 8/2010 |
| JP | 2013-066000 | 4/2013 |
| WO | WO 01/78335 | 10/2001 |
| WO | 2009/036315 | 3/2009 |

OTHER PUBLICATIONS

GB Office Action dated May 16, 2016 in counterpart GB Application No. GB1412723.7.
Chinese Office Action dated Dec. 7, 2016, in counterpart Chinese Patent Application No. 201410335885.0, with an English translation thereof.

* cited by examiner

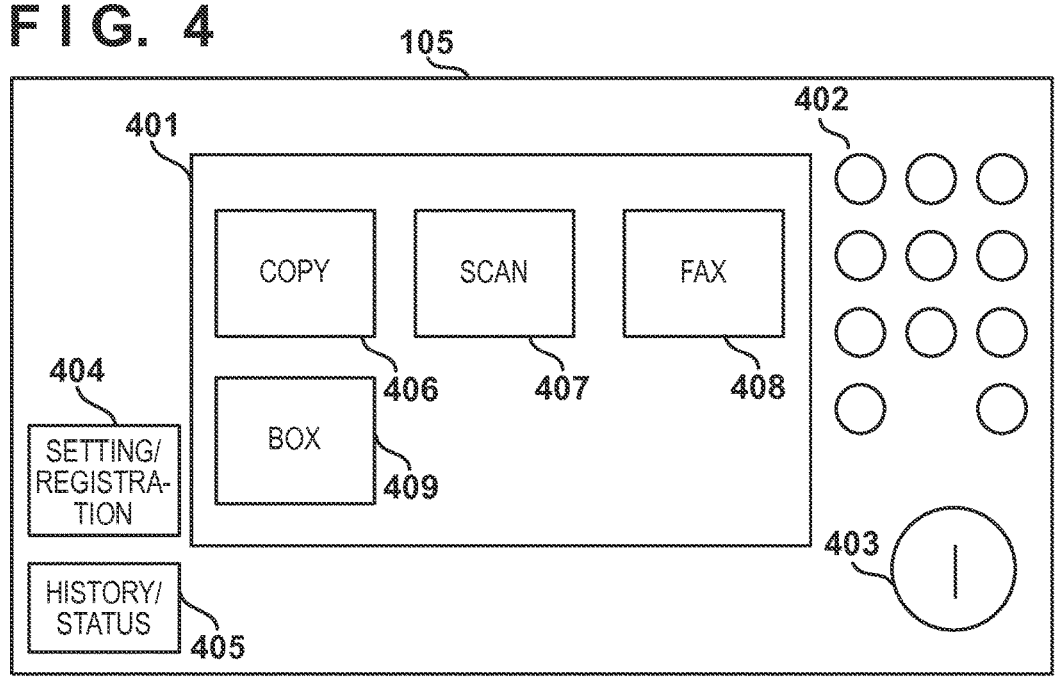
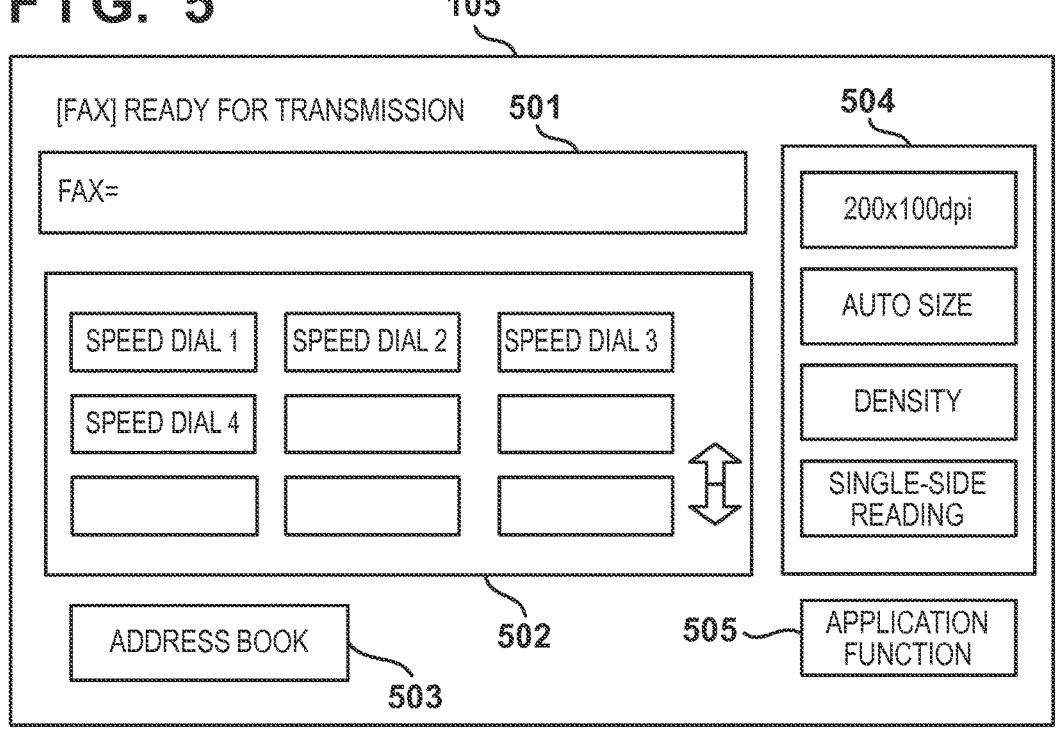

F I G. 10
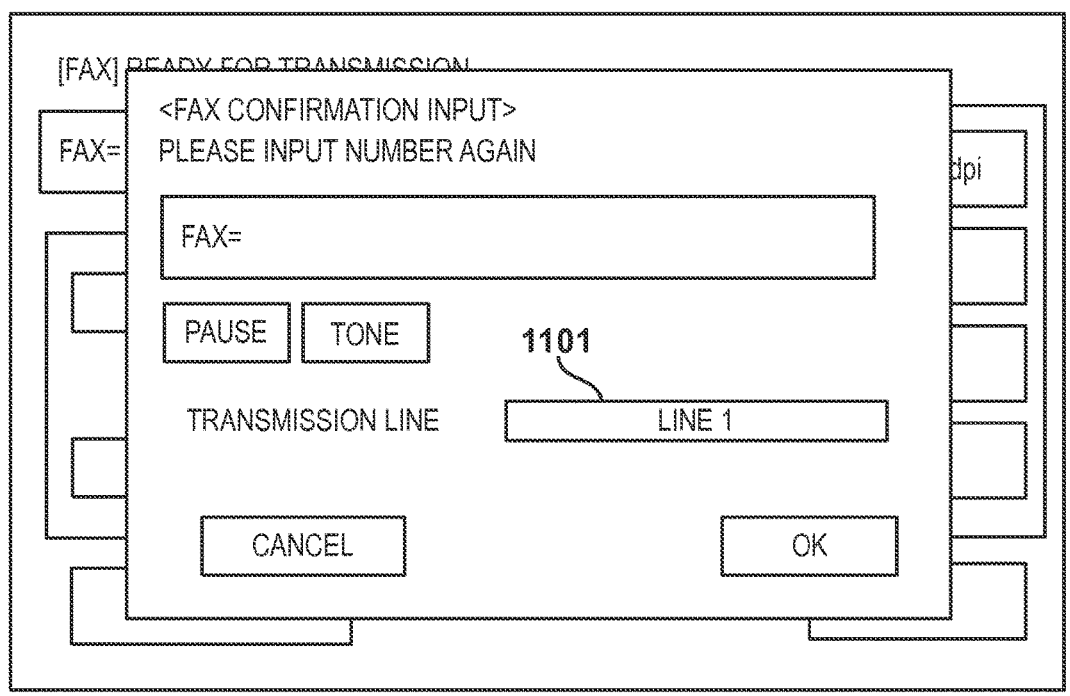

FACSIMILE APPARATUS AND METHOD FOR CONTROLLING THE SAME TO PREVENT MISTAKEN TRANSMISSION

BACKGROUND OF THE INVENTION

Field of the Invention

The present invention relates to a facsimile apparatus, and a method for controlling the same that prevent mistaken transmission due to re-entry of a destination when performing facsimile transmission.

Description of the Related Art

When performing facsimile (hereinafter also abbreviated as fax) transmission, a user directly inputs the fax number of a desired transmission destination from an operation unit using a numerical keypad and the like if the destination is not registered either in an address book or as a speed dial etc., of a facsimile apparatus, and performs the facsimile transmission. At that time, if the user designates an unintended number by mistake and performs fax transmission without being aware of the mistake, a document for fax transmission will be transmitted to a wrong destination (hereinafter also referred to mistaken transmission). This may cause not only a situation in which an intended recipient cannot receive necessary information, but also a situation in which serious information leakage occurs if the transmitted document is a confidential document that is not allowed to be viewed by a third person. In order to address the problems, Japanese Patent Laid-Open No. 02-200058 proposed a fax apparatus that requires a user to input, when transmitting a document, the number of a fax apparatus of a transmission destination twice, and transmits the document if the first input number and the second input number match each other.

Furthermore, in recent years, IP fax, which complies with ITU-T recommendation T.38, in addition to G3 fax, which is defined by ITU-T recommendation T.30 and uses an analog telephone network, have been in practical use. The IP fax is a function to perform fax transmission using, instead of the conventional analog telephone line, an IP network, and can perform, even if one LAN cable is physically connected, transmission to different communication networks by designating a transmission mode from among Intranet, NGN, VoIP GW, and the like.

In this context, "Intranet" refers to an extension line network that uses IP-PBX, and "NGN" refers to a public IP network provided by the NTT and to a communication network that has the same telephone number system as that of an analog public telephone network. Furthermore, "VoIP GW" connects the Intranet to the public telephone network, and connects, via the Intranet, to a G3 fax apparatus that is connected to the public telephone network. In the transmission using these communication networks, connection to a transmission partner is made by a procedure that is called SIP, and the transmission partner is designated by a telephone number. A user can perform fax transmission to the desired transmission partner by designating the fax number of the transmission destination and a communication mode.

However, the above-described conventional technique has the following problems. The above-described conventional technique requires the user to input the fax number of a transmission destination twice, and thereby prevents transmission of a document to an unintended destination due to a typing error. The mistaken transmission can be prevented when the transmission destination can be specified by a fax number. However, when it is possible to select a communication network to connect to as in the case of the IP fax, the confirmation of a fax number is by itself not sufficient to prevent the mistaken transmission.

For example, assume an IP fax apparatus that is connected to both the Intranet, serving as an extension line network, and the NGN or the VoIP GW, serving as an external line network. If a user tries to transmit, using this apparatus, an internal document to another IP fax apparatus connected to the Intranet, and designates, as a communication mode, the NGN or the VoIP GW by mistake, the IP fax apparatus will call the external network. Here, if there is, in the public telephone network to which the apparatus is connected via the NGN or the VoIP GW, an apparatus that has the same number as that of the IP fax apparatus in the Intranet to which the user tried to transmit the internal document, the internal document will be transmitted to the external IP fax apparatus, resulting in information leakage.

Furthermore, since the IP fax is not yet widespread, an IP fax apparatus may have an external line connected to an analog public telephone line in order to connect to the conventional G3 fax, and an extension line connected to an in-company Intranet. In this case, similarly to the above-described case, if there are fax apparatuses having the same number in the public telephone line and the Intranet, transmission to an unintended destination will be likely to occur by a user designating a wrong communication network to connect to.

SUMMARY OF THE INVENTION

The present invention enables realization of a mechanism of a facsimile apparatus connected to a plurality of communication networks that prevent mistaken transmission due to a user's operation.

One aspect of the present invention provides a facsimile apparatus connectable to a plurality of communication networks, comprising: a first accepting unit configured to accept inputs of a destination of facsimile transmission and a communication network to be used for the facsimile transmission; a second accepting unit configured to accept, after the first accepting unit has accepted the inputs of the destination and the communication network, re-entry of the destination and the communication network; a comparing unit configured to compare the destination and the communication network that were accepted by the first accepting unit, with the destination and the communication network that were accepted by the second accepting unit; and an execution unit configured to execute the facsimile transmission if both the destination and the communication network accepted by the first accepting unit match respective ones accepted by the second accepting unit, as a result of the comparison by the comparing unit, and not to execute the facsimile transmission if at least one of the destination and the communication network accepted by the first accepting unit does not match the corresponding one accepted by the second accepting unit.

Another aspect of the present invention provides a facsimile apparatus connectable to a plurality of communication lines comprising: a first accepting unit configured to accept inputs of a destination of facsimile transmission and a communication line to be used for the facsimile transmission; a second accepting unit configured to accept, after the first accepting unit has accepted the inputs of the destination and the communication line, re-entry of the destination and the communication line; a comparing unit configured to compare the destination and the communication line that were accepted by the first accepting unit, with the destination and the communication line that were accepted by the second accepting unit; and an execution unit configured to execute the facsimile transmission if both the destination and the communication line accepted by the first accepting unit match respective ones accepted by the second accepting unit, as a result of the comparison by the comparing unit, and not to execute the facsimile transmission if at least one of the destination and the communication line accepted by the first accepting unit does not match the corresponding one accepted by the second accepting unit.

Still another aspect of the present invention provides a method for controlling a facsimile apparatus connectable to a plurality of communication networks, comprising: a first accepting step of a first accepting unit accepting inputs of a destination of facsimile transmission and a communication network to be used for the facsimile transmission; a second accepting step of a second accepting unit accepting, after the inputs of the destination and the communication network have been accepted in the first accepting step, re-entry of the destination and the communication network; a comparing step of a comparing unit comparing the destination and the communication network that were accepted in the first accepting step, with the destination and the communication network that were accepted in the second accepting step; and an executing step of an execution unit executing the facsimile transmission if both the destination and the communication network accepted in the first accepting step match respective ones accepted in the second accepting step, as a result of the comparing step, and not executing the facsimile transmission if at least one of the destination and the communication network accepted in the first accepting step does not match the corresponding one accepted in the second accepting step.

Yet still another aspect of the present invention provides a method for controlling a facsimile apparatus connectable to a plurality of communication lines, comprising: a first accepting step of a first accepting unit accepting inputs of a destination of facsimile transmission and a communication line to be used for the facsimile transmission; a second accepting step of a second accepting unit accepting, after the inputs of the destination and the communication line have been accepted in the first accepting step, re-entry of the destination and the communication line; a comparing step of a comparing unit comparing the destination and the communication line that were accepted in the first accepting step, with the destination and the communication line that were accepted in the second accepting step; and an executing step of an execution unit executing the facsimile transmission if both the destination and the communication line accepted in the first accepting step match respective ones accepted in the second accepting step, as a result of the comparing step, and not executing the facsimile transmission if at least one of the destination and the communication line accepted in the first accepting step does not match the corresponding one accepted in the second accepting step.

Still yet another aspect of the present invention provides a non-transitory computer-readable storage medium storing a computer program for causing a computer to function as the facsimile apparatus.

Further features of the present invention will be apparent from the following description of exemplary embodiments with reference to the attached drawings.

BRIEF DESCRIPTION OF THE DRAWINGS

FIG. 4 is a diagram illustrating an example of an operation unit and a home screen according to the first embodiment.

FIG. 5 is a diagram illustrating an example of a fax operation screen according to the first embodiment.

FIG. 10 is a diagram illustrating an example of a fax destination re-entry screen according to the second embodiment.

DESCRIPTION OF THE EMBODIMENTS

Figure 1:
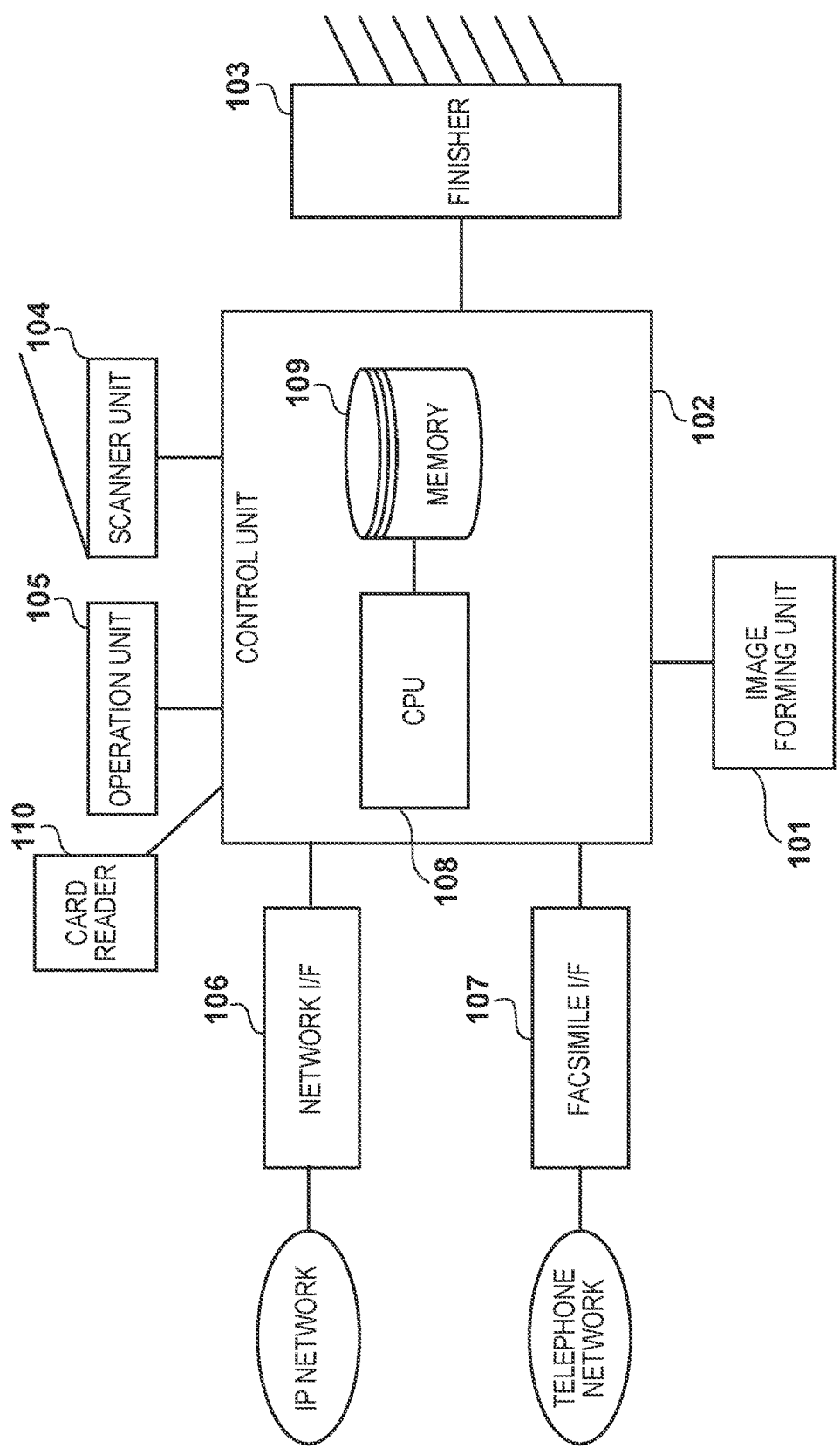
FIG. 1 is a block diagram schematically illustrating a configuration of an image processing apparatus according to a first embodiment.

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Configuration of an image processing apparatus Hereinafter, a first embodiment of the present invention will be described with reference to FIGS. 1 to 8. First, an example of a configuration of a Multi-Function Peripheral (MFP), which serves as an image processing apparatus to which a facsimile apparatus of the present invention is applied, will be described with reference to FIG. 1.

A multi-function peripheral 100 includes an image forming unit 101 for forming an image on recording paper by a method such as an electro-photographic method, and a control unit 102 for performing overall control of the multi-function peripheral 100. Furthermore, the multi-function peripheral 100 includes a finisher 103 for performing post-processing such as stapling processing, a scanner unit 104 for reading a document image, and an operation unit 105 with which an operator inputs various types of data and commands. The multi-function peripheral 100 further includes a network interface 106 that transmits and receives image data via a network, and a facsimile interface 107 that transmits and receives facsimile data, and a card reader 110 that performs authentication of a user who uses the apparatus. Each of the components is connected to the control unit 102 via a dedicated interface.

The control unit 102 includes, as main components, a central processing unit (CPU) 108 and a storage device (memory) 109. The memory 109 has stored therein control programs that correspond to the respective flowcharts of FIGS. 8, 11, 13, and 14, the flowcharts being performed by the multi-function peripheral 100. The memory 109 has further stored therein control programs of the setting dialog boxes shown in FIGS. 4, 5, 6, 7, 9, 10 and 12, and contents or the like in which operation screen information is described.

Figure 2:
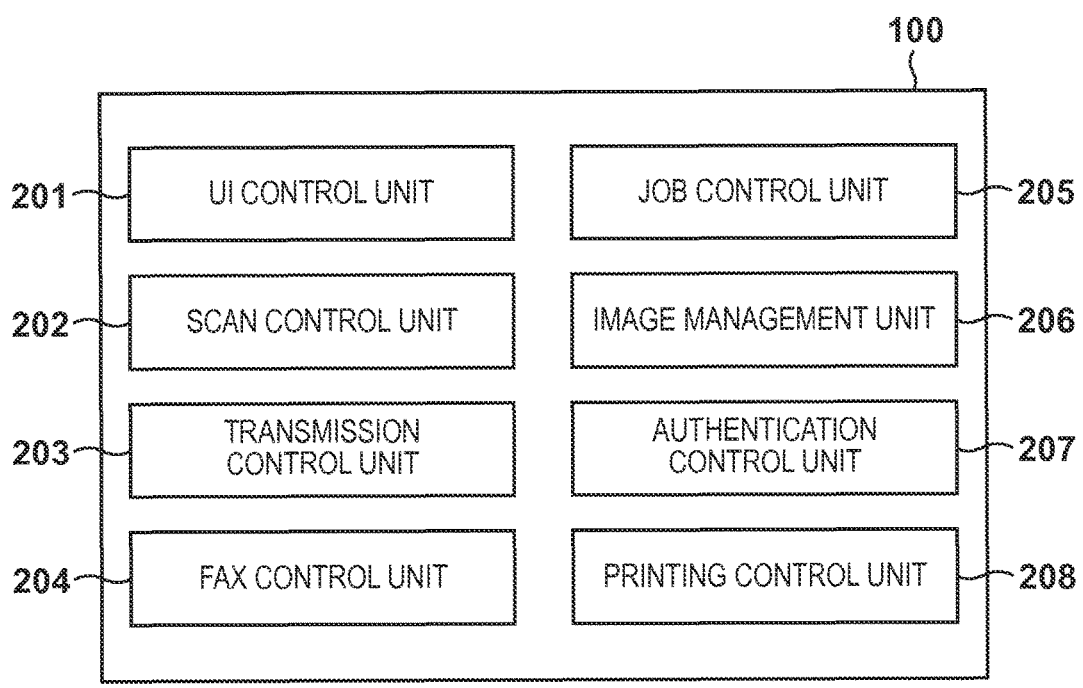
FIG. 2 is a block diagram illustrating software configurations for controlling the image processing apparatus according to the first embodiment.

Software Configurations of the Image Processing Apparatus Hereinafter, software configurations for controlling the multi-function peripheral of the present invention will be described with reference to FIG. 2. The multi-function peripheral 100 includes, as software configurations, a UI control unit 201, a scan control unit 202, a transmission control unit 203, a fax control unit 204, a job control unit 205, an image management unit 206, an authentication control unit 207, and a printing control unit 208. Note that these software configurations may be realized also as hardware configurations, or configurations of a combination of hardware and software.

The UI control unit 201 displays an operation screen on the operation unit 105, and controls a user interface (UI) that accepts operations of a user (operator). The operation unit 105 is, for example, a touch panel type liquid crystal display, and can display an operation screen and accept inputs by the user. The scan control unit 202 controls the scanner unit 104 and processing for reading a document image. The transmission control unit 203 controls processing for transmitting, via the network interface 106, image data read by the scan control unit 202 to a destination that the user has designated. Specifically, the transmission control unit 203 controls e-mail transmission and transmission to a file server or the like.

The fax control unit 204 controls G3 fax transmission and reception via the facsimile interface 107. Furthermore, the fax control unit 204 controls IP fax transmission and reception via the network interface 106. The job control unit 205 manages a transmission request from a user that was accepted by the UI control unit 201, and manages the execution state and history of the transmission request. The image management unit 206 manages management information on an image read by the scanner unit 104. The authentication control unit 207 specifies a user who uses the multi-function peripheral 100 based on information read by the card reader 110, and manages the information on the user. The printing control unit 208 controls, using the image forming unit 101, printing of image data read by the scanner unit, a received fax document, a transmission result report, and the like onto paper. These pieces of the control software are stored in the memory 109, and executed by the CPU 108.

Figure 3:
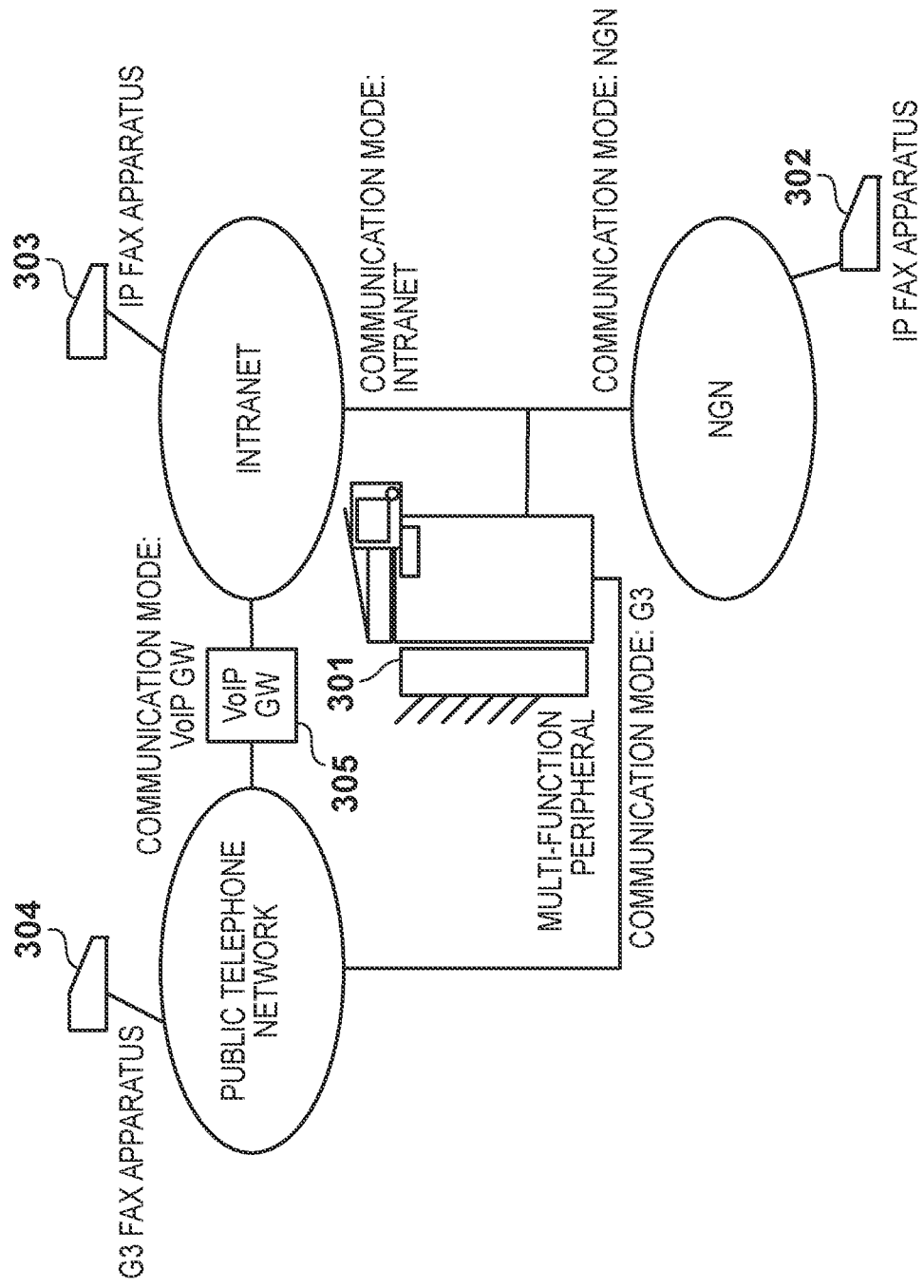
FIG. 3 is a diagram illustrating a system to which the present embodiment is applied, according to the first embodiment.

System Configuration Hereinafter, a configuration of a system applied to the present embodiment will be described with reference to FIG. 3. As shown in FIG. 3, reference numeral 301 denotes a multi-function peripheral to which the present invention is applied. Note that the multi-function peripheral 301 is the same apparatus as the multi-function peripheral 100. Reference numeral 302 denotes an IP fax apparatus that is connected to the NGN. Reference numeral 303 denotes an IP fax apparatus that is connected to the Intranet. Furthermore, reference numeral 304 denotes a G3 fax apparatus that is connected to a public telephone network. Reference numeral 305 denotes a VoIP GW that connects the Intranet and the public telephone network.

A user can perform transmission to a desired fax apparatus by designating a communication mode during fax transmission on a fax operation screen, which will be described later, of the multi-function peripheral. That is, when performing transmission to the IP fax apparatus 302 connected to the NGN, the user selects "NGN" as the communication mode, together with the fax number. When performing transmission to the IP fax apparatus 303 connected to the Intranet, the user selects "Intranet" as the communication mode. When performing transmission to the G3 fax apparatus 304 connected to the conventional public telephone network, the user selects "G3" as the communication mode. Alternatively, the user may also perform transmission to the G3 fax apparatus 304 by selecting "VoIP GW" as the communication mode and connecting to the public telephone network via the Intranet and the VoIP GW 305.

Home Screen Hereinafter, an example of a home screen to be displayed on the operation unit 105 will be described with reference to FIG. 4. As shown in FIG. 4, the item denoted by reference numeral 401 includes application selection buttons that respectively call, by being pressed by the user, operation screens for performing desired processing. Note here that a "copy" button 406, a "scan" button 407, a "fax" button 408, and a "box" button 409 are displayed, which respectively call operation screens for the copy function, the network scan function, the fax function, and the box function. Furthermore, a numerical keypad 402 and a start key 403 for instructing a job start are provided. Furthermore, a "setting/registration" screen calling button 404 for calling a setting/registration screen for the apparatus, and a "history/status" button 405 for calling a history/status screen for a job are also provided.

Fax Operation Screen Hereinafter, a fax operation screen will be described with reference to FIGS. 5 to 7. First, FIG. 5 illustrates an example of the fax operation screen that is displayed on the operation unit 105 by the user pressing the "fax" button 408. As shown in FIG. 5, a fax number display region 501, speed dial (one-touch dial or shorten dial) buttons 502, and an address book calling button 503 are displayed. When a speed dial button 502 has been pressed, a fax destination registered for that button is called. When the address book calling button 503 has been pressed, an address book in which fax destinations are registered is displayed.

When performing transmission to a destination that is not registered either as a speed dial or in the address book, the user can directly input a fax transmission destination by operating the numerical keypad 402. The input destination is displayed in the fax number display region 501. Furthermore, reference numeral 504 denotes transmission setting buttons for configuring fax transmission settings, such as the reading resolution and the size of a document to be read. Reference numeral 505 denotes an application function button for calling various advanced settings at the time of reading and transmission.

Figure 6:
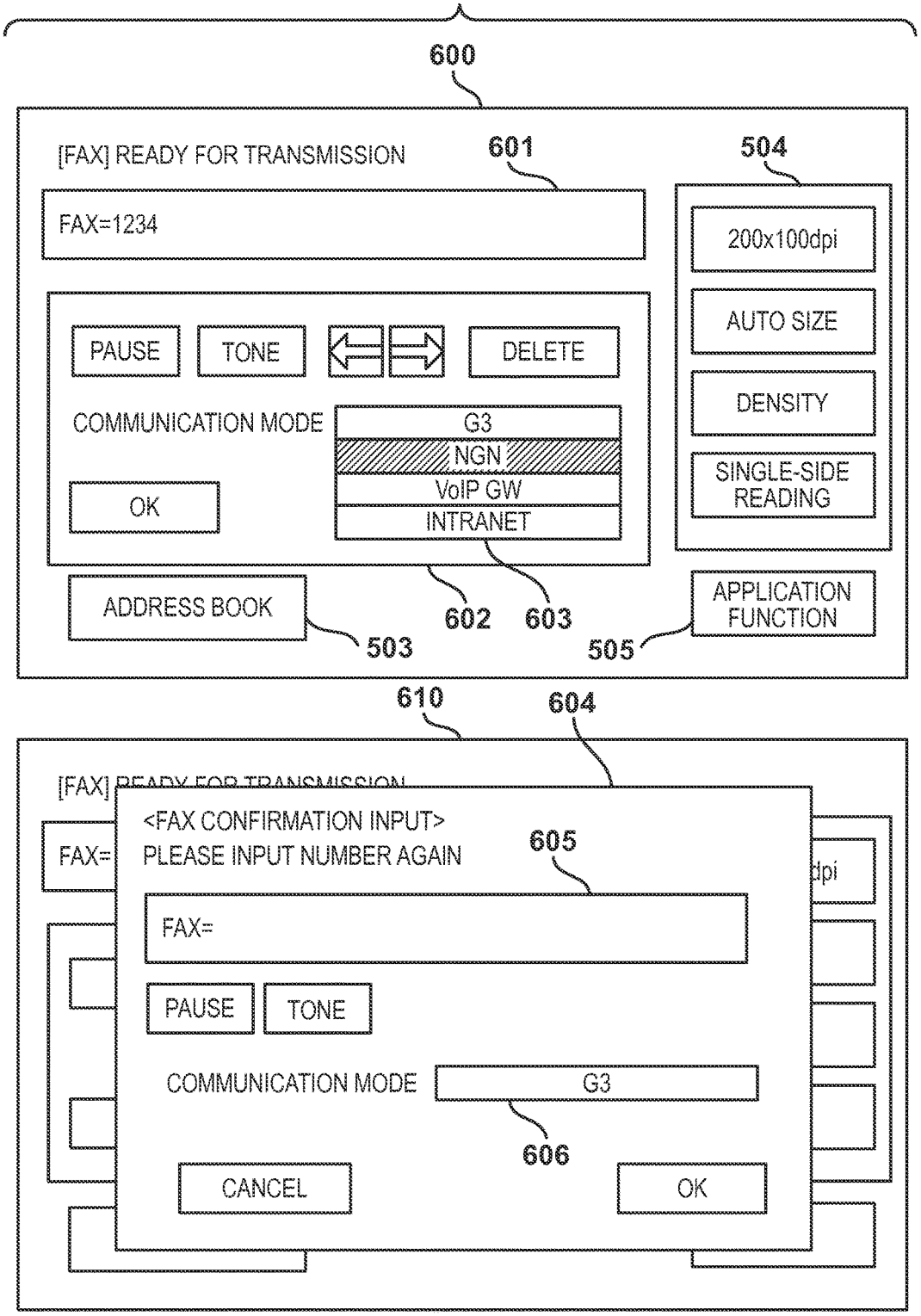
FIG. 6 illustrates examples of the fax operation screen when a fax destination is directly input and when a fax destination is re-entered, according to the first embodiment.

Reference numeral 600 of FIG. 6 denotes an example of the fax operation screen displayed when the user directly inputs a fax transmission destination by operating the numerical keypad 402. As denoted by reference numeral 601, the fax number 1234 that was directly input by the user is displayed in the fax number display region 601. Furthermore, instead of the speed dial buttons 502, a new destination setting region 602 is displayed, in which a communication mode designation pull-down menu 603 for designating a communication network to connect to at the time of transmission is also displayed.

Here, this fax apparatus can perform G3 fax transmission and IP fax transmission, and the user can select any of "G3", "NGN", "VoIP GW", and "Intranet" as the communication mode. Furthermore, "G3" is set as the default communication mode. This screen 600 shows that "NGN" was selected by the user, and the corresponding pull-down menu option is highlighted. Accordingly, unless the user selects the correct communication mode in addition to the fax number, transmission to a desired fax apparatus will fail, as well as transmission to another fax apparatus different from the desired fax apparatus will be likely to occur if there is, in a different communication network, a fax apparatus having the same number as that of the desired fax apparatus.

Reference numeral 610 of FIG. 6 denotes an example of the fax destination re-entry screen that is displayed when the user has pressed the start key 403 and instructed fax transmission. As displayed on the screen 610, reference numeral 604 denotes a destination re-entry pop-up screen, which includes a fax number re-entry region 605 and a communication mode re-designation pull-down menu 606. On the destination re-entry pop-up screen, the fax number re-entry region 605 is displayed blank since the destination re-entry pop-up screen is to request the user to re-enter a transmission destination, and also the default of the communication mode re-designation pull-down menu 606 is displayed. In this example, the default is "G3". If the fax number and the communication mode that were input on this screen are the same as those that were input on the screen 600 of FIG. 6, fax transmission is started.

Figure 7:
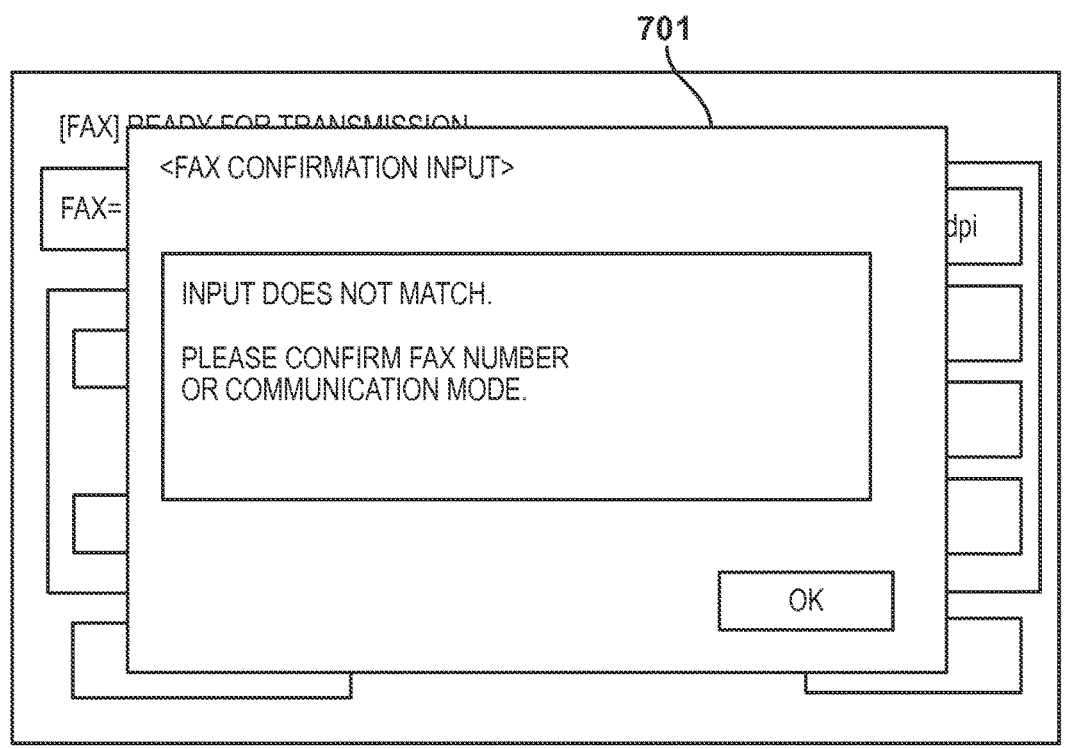
FIG. 7 is a diagram illustrating an example of an error pop-up screen according to the first embodiment.

FIG. 7 shows an error pop-up screen that is displayed when the re-entry on the screen 610 of FIG. 6 was not correct. Reference numeral 701 denotes an example of the error pop-up screen indicating that the first input information and the re-entered information do not match each other. Here, the user is prompted to confirm the fax number and the communication mode.

Processing Procedure

Figure 8:
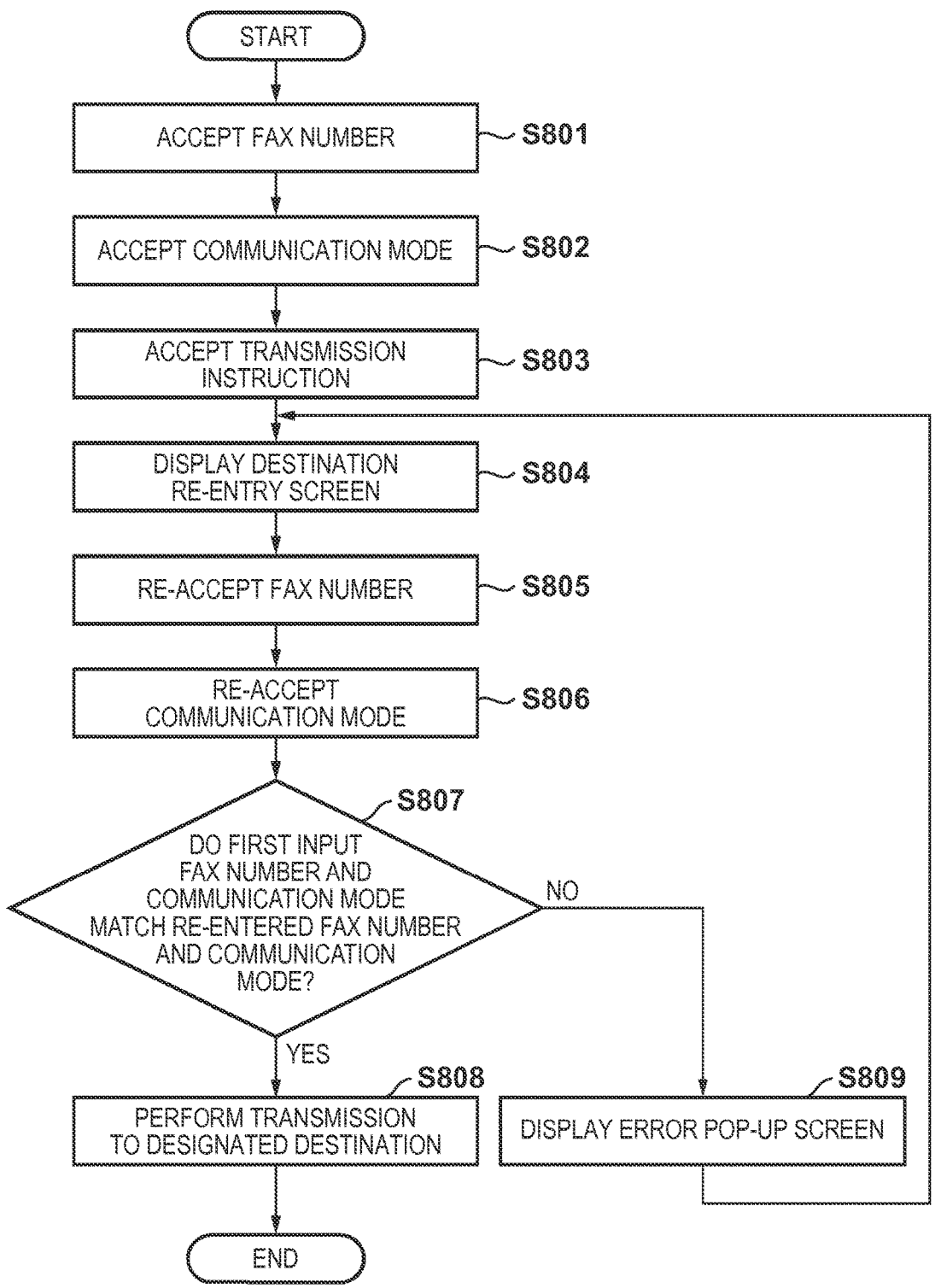
FIG. 8 is a flowchart illustrating a series of processes for confirming a directly input fax destination according to the first embodiment.

Hereinafter, processing for confirming a directly input fax destination will be described with reference to FIG. 8. Note that the control program according to the processing flow is stored in the memory 109, and is executed by the CPU 108.

Accepting a Fax Destination First, in step S801, the UI control unit 201 accepts a fax number that the user has input by operating the numerical keypad 402 provided on the operation unit 105. Here, the number that the user has input is 1234. Subsequently, in step S802, the UI control unit 201 accepts a communication mode that the user has designated using the communication mode designation pull-down menu 603 of the fax basic screen in order to instruct the connection to a desired communication network. Here, the user has designated "NGN".

Then, in step S803, the UI control unit 201 detects that the user has pressed the start key 403, and accepts a transmission instruction, and in step S804, the UI control unit 201 displays, on the operation unit 105, the destination re-entry screen 604 that requests the user to re-enter the transmission destination.

Re-Confirmation of the Fax Destination

The UI control unit 201 accepts, in step S805, a re-entered fax number that the user has input to the fax number re-entry region 605, and accepts, in step S806, a re-designated communication mode that the user has re-designated using the communication mode re-designation pull-down menu 606. Subsequently, in step S807, the UI control unit 201 compares the first input information accepted in steps S801 and S802, with the re-entered information accepted in steps S805 and S806. Furthermore, the UI control unit 201 determines whether or not the fax number accepted in step S801 matches the re-entered fax number accepted in step S805, and the communication mode accepted in step S802 matches the re-designated communication mode accepted in step S806. That is, if the re-entered fax number is 1234 and the re-designated communication mode is "NGN", it is then determined that they match each other, and otherwise, it is determined that they do not match each other.

If the result of the determination in step S807 is Yes, the procedure advances to step S808, where the UI control unit 201 inputs a transmission job to the job control unit 205. The job control unit 205 cooperates with the scan control unit 202, the image management unit 206, and the fax control unit 204, and transmits a document read by the scanner unit 104 to a designated destination via the network interface 106, and the procedure ends. Note that, when the communication mode designated by the user in step S802 is "G3", the fax control unit 204 transmits the document to the designated destination via the facsimile interface 107. If the result of the determination in step S807 is No, the procedure advances to step S809, where the UI control unit 201 displays an error pop-up screen 701, and then returns to step S804.

As described above, the facsimile apparatus (multi-function peripheral 100) according to the present embodiment requests, when the user has directly set a destination and a communication mode for facsimile transmission, the user to re-enter both the two setting items. Then, the facsimile apparatus executes the facsimile transmission only if both the input two items match each other, in other words, only if the destinations match each other and the communication modes match each other, and otherwise, the facsimile apparatus notifies the user of the error. With this, it is possible to prevent mistaken transmission even when the user has input a wrong destination number or a wrong communication mode. For example, even when the user has input a wrong communication mode, it is possible to prevent mistaken transmission to the same destination number in a communication network different from the communication network to which the user wants to perform transmission.

Second Embodiment

Figure 11:
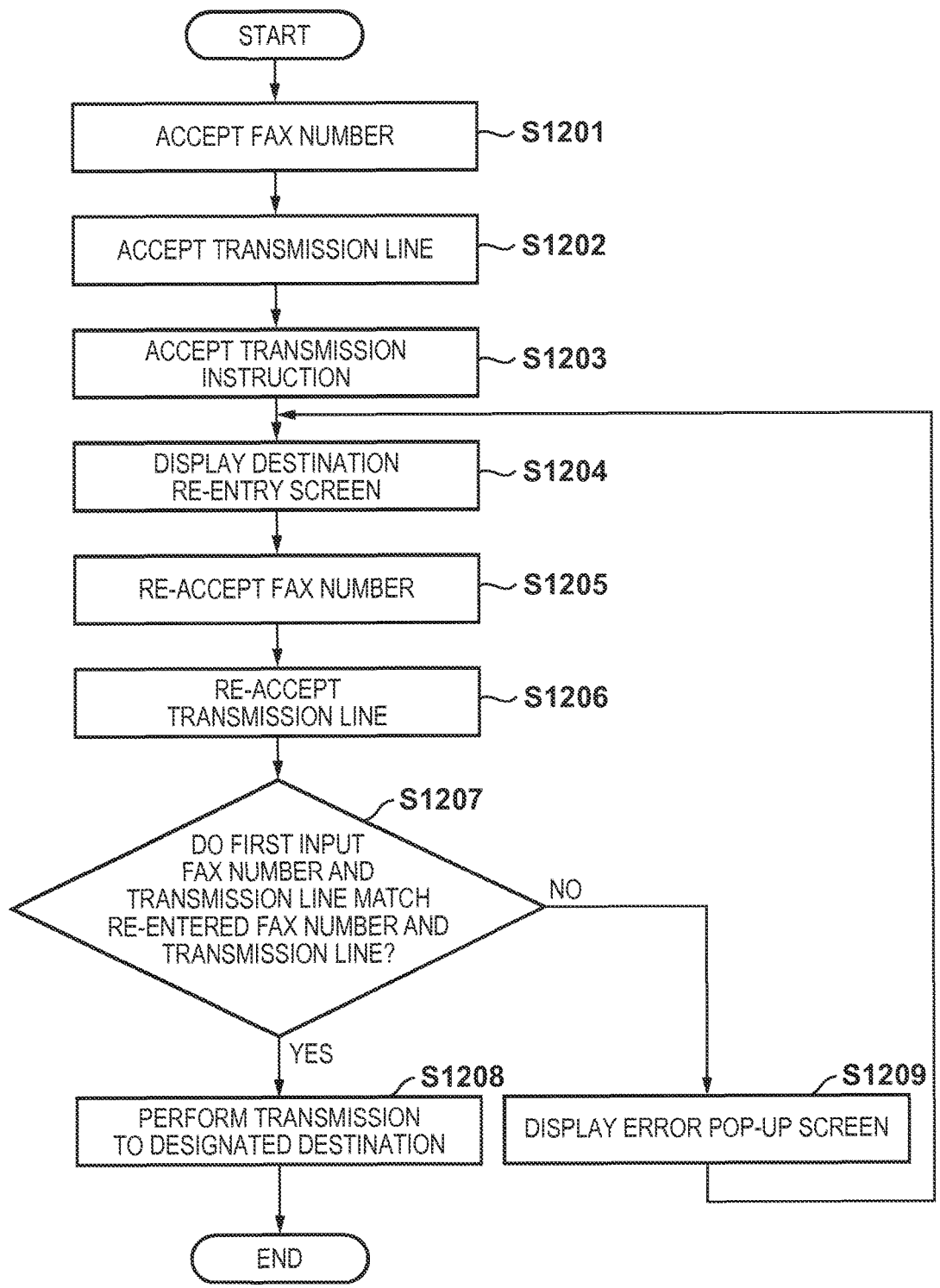
FIG. 11 is a flowchart illustrating a series of processes for confirming a directly input fax destination according to the second embodiment.

Hereinafter, a second embodiment of the present invention will be described with reference to FIGS. 9 to 11. In the above described first embodiment, both G3 fax transmission and IP fax transmission are possible, and a communication network to connect to is designated with a communication mode. However, a configuration is also possible in which there is only G3 as the communication mode but there are a plurality of telephone lines including one telephone line for an extension line and the other telephone lines for external lines. In this case, similarly to the above-described case, transmission to an unintended destination may occur when a wrong line has been selected. Therefore, the present embodiment will describe control for preventing mistaken transmission in the above-described line configuration.

First, an example of an application function setting screen that is displayed by the application function button 505 of the fax basic screen being pressed will be described with reference to reference numeral 900 of FIG. 9. Application functions are displayed over multiple pages, and in this example, facsimile-related function buttons on page 3 are displayed. Here, reference numeral 901 denotes a line selection button for calling a screen with which a communication line for use in transmission is selected.

Figure 9:
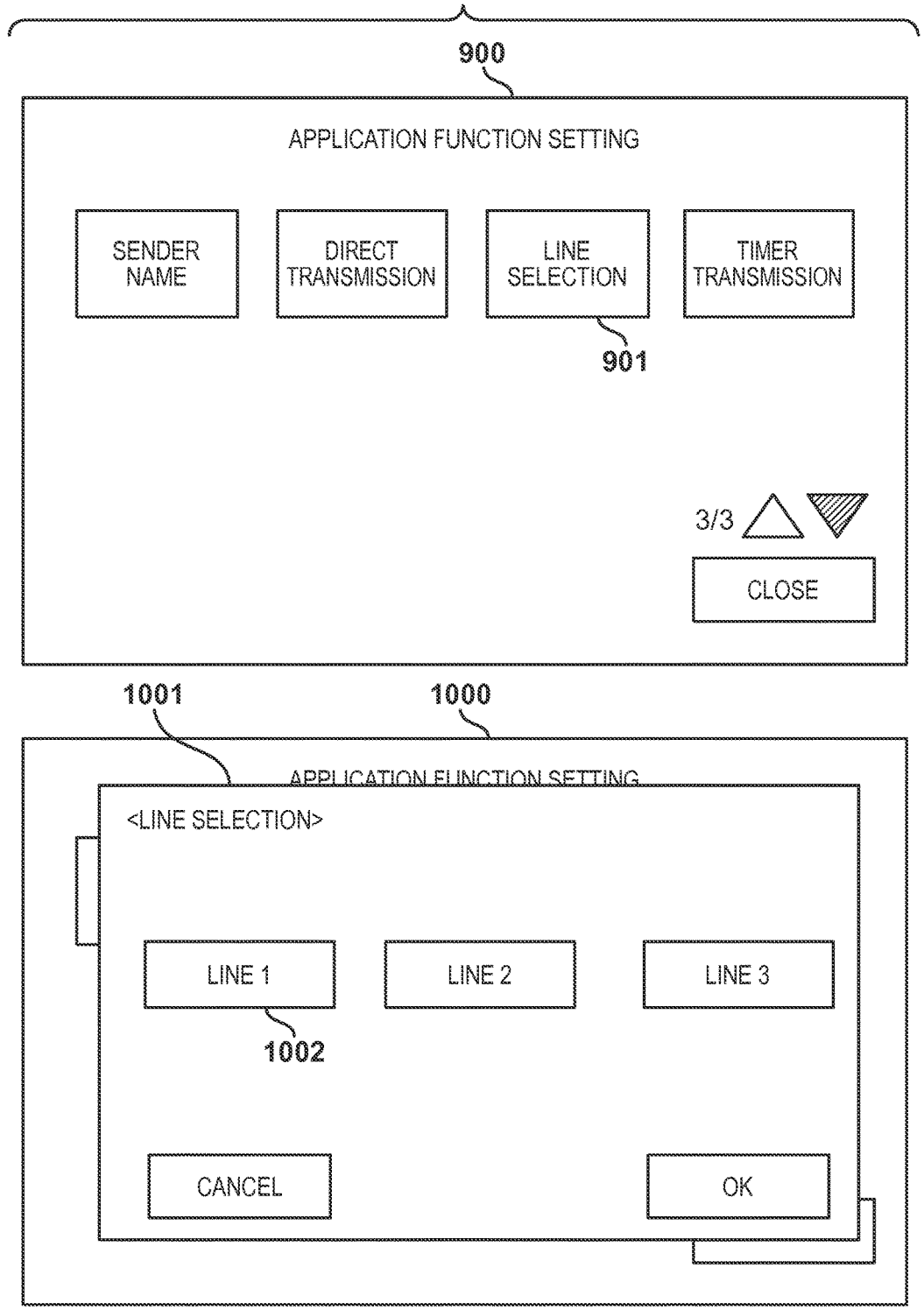
FIG. 9 illustrates examples of an application function setting screen according to a second embodiment.

Reference numeral 1000 of FIG. 9 is an example of a line selection screen with which a communication line for use in transmission is designated. On a line selection screen 1001, "line 1", "line 2", and "line 3" buttons 1002 are displayed, which respectively instruct the uses of communication lines 1, 2, and 3.

FIG. 10 illustrates an example of a fax destination re-entry screen according to the second embodiment. Although the destination re-entry pop-up screen includes a fax number re-entry region similarly to FIG. 6, a transmission line re-designation pull-down menu 1101 is provided, instead of the communication mode re-designation pull-down menu.

Processing Procedure Hereinafter, processing for confirming the directly input fax destination according to the present embodiment will be described with reference to FIG. 11. The control program according to the processing flow is stored in the memory 109, and is executed by the CPU 108. Note that many processes in the flowchart of FIG. 11 are similar to those in the flowchart of FIG. 8, and thus only differences therebetween are described here.

Accepting a Fax Destination

The procedure in step S1201 is the same as the procedure in step S801. Subsequently, in step S1202, the UI control unit 201 accepts a transmission line (communication line) that the user has selected by pressing a line selection button on the line selection screen 1001. The procedures in steps S1203 and S1204 are the same as the respective procedures in steps S803 and S804.

Re-Confirmation of the Fax Destination

The procedure in step S1205 is the same as the procedure in step S805. Subsequently, in step S1206, the UI control unit 201 accepts a re-designated transmission line that the user has re-designated using the transmission line re-designation pull-down menu 1101. In step S1207, the first input information accepted in steps S1201 and S1202 is compared with the re-entered information accepted in steps S1205 and S1206. Furthermore, the UI control unit 201 determines whether or not the fax number accepted in step S1201 and the re-entered fax number accepted in step S1205 match each other, and the transmission line accepted in step S1202 and the re-designated transmission line accepted in step S1206 match each other.

If the result of the determination in step S1207 is Yes, the procedure advances to step S1208, and then ends. If the result of the determination in step S1207 is No, the procedure advances to step S1209, and then returns to step S1204. Note that the procedures in steps S1208 and S1209 are the same as the respective procedures in steps S808 and S809.

As described above, the facsimile apparatus (multi-function peripheral 100) according to the present embodiment requests, when the user has directly set a destination and a communication line for facsimile transmission, the user to re-enter both the two setting items. Then, the facsimile apparatus executes the facsimile transmission only if both the input two items match each other, in other words, only if the destinations match each other and the communication lines match each other, and otherwise, the facsimile apparatus notifies the user of the error. With this, it is possible to prevent mistaken transmission even when the user has input a wrong destination number or a wrong communication line. For example, even when the user has input a wrong communication line, it is possible to prevent mistaken transmission to the same destination number in a communication line (external line) different from the communication line (extension line) to which the user wants to perform transmission.

Third Embodiment

Hereinafter, a third embodiment of the present invention will be described with reference to FIGS. 12 and 13. In the case where the multi-function peripheral 100 to which the present invention is applied is connectable to a plurality of communication networks, and all the connectable communication networks are external line networks or extension line networks, transmission to an unintended fax apparatus is impossible as long as the fax number is correct, even if the user has designated a wrong communication network as a connection target. In such circumstances, if a user is also requested to re-designate the connection target at the time of confirmation of the fax destination, operability of fax transmission will be reduced. Therefore, the present embodiment will describe control for reducing such operation troublesome for the user as much as possible.

Figure 12:
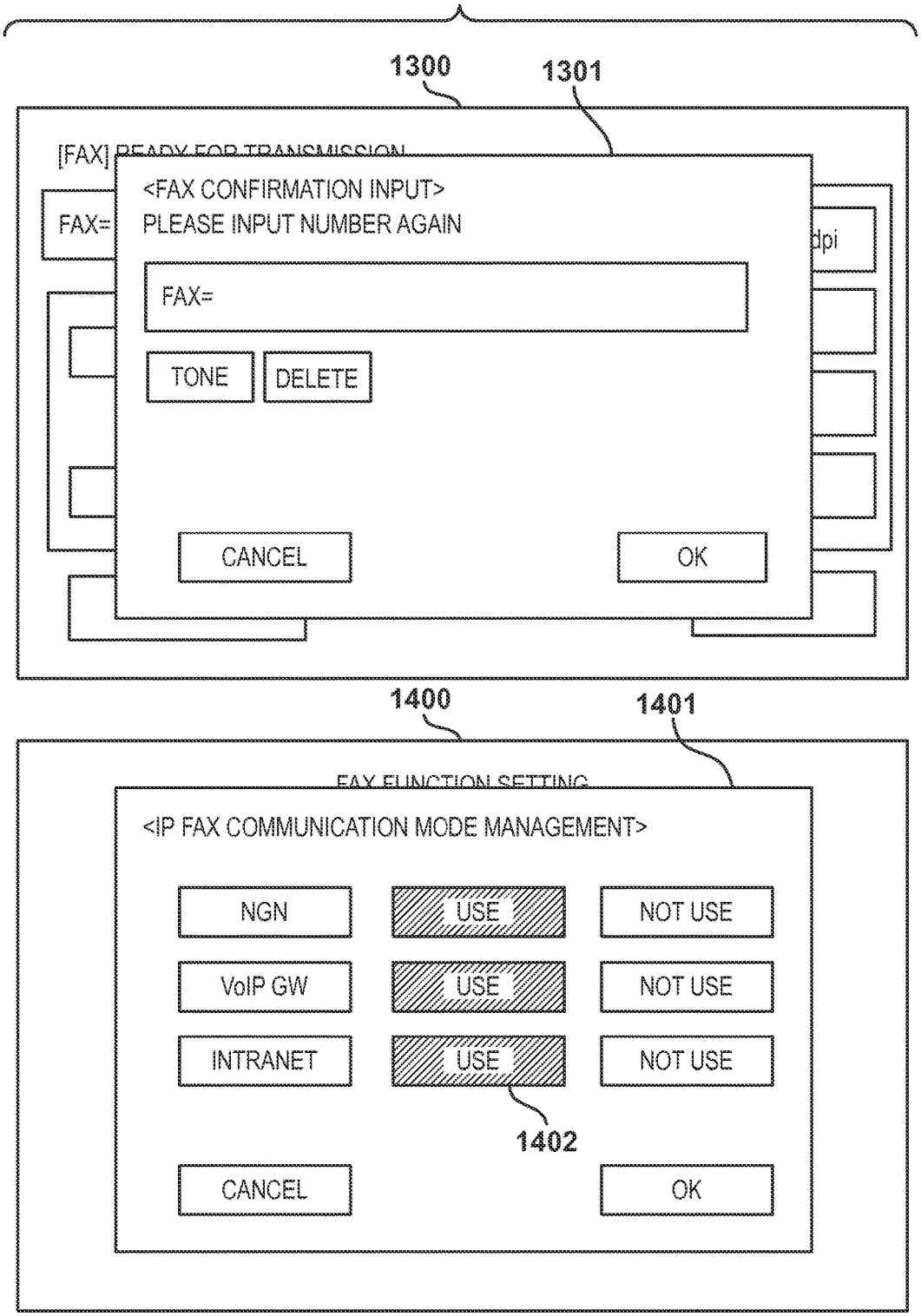
FIG. 12 illustrates examples of a destination re-entry screen that does not require re-designation of a connection target, according to a third embodiment.
Figure 13:
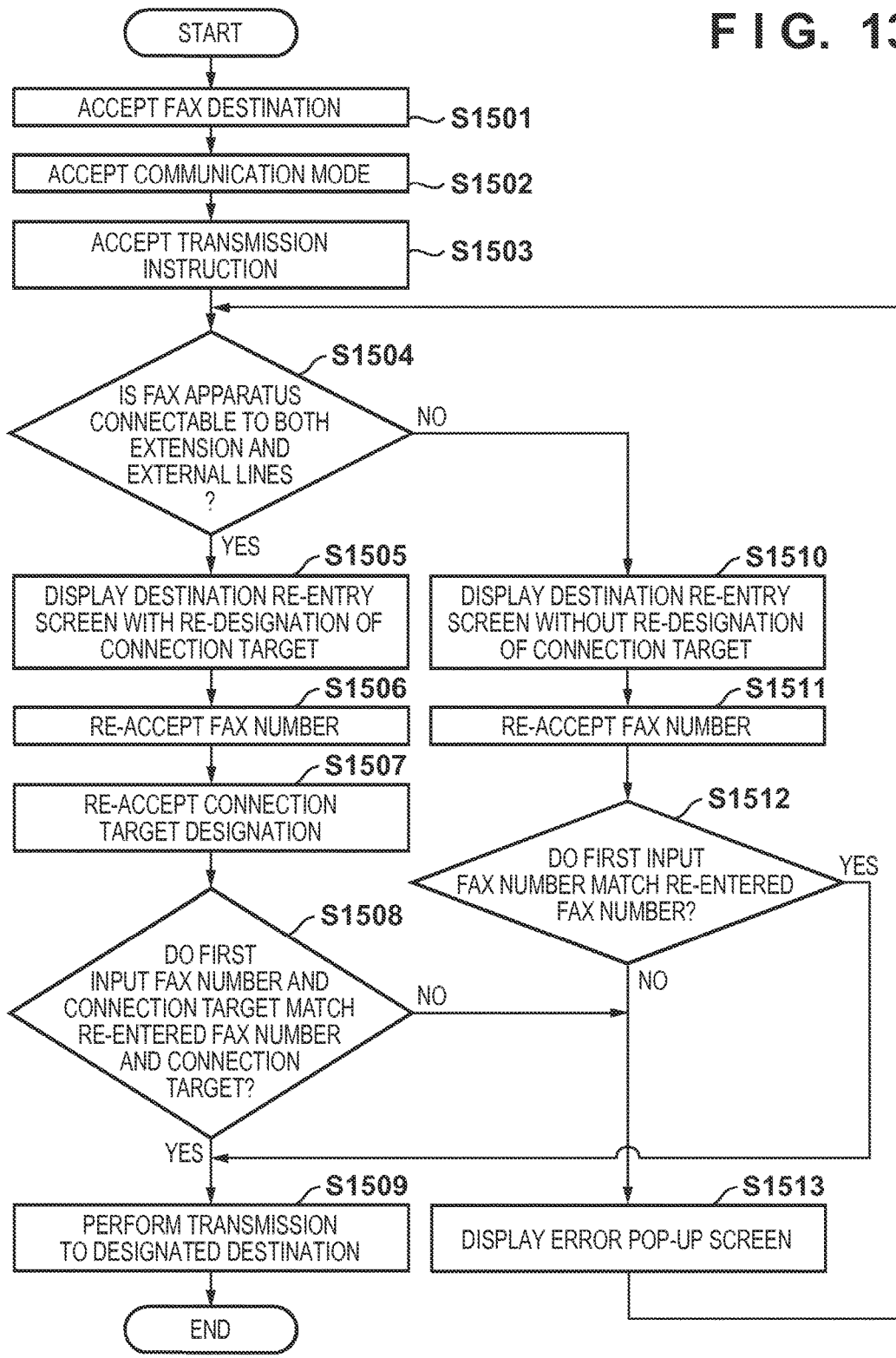
FIG. 13 is a flowchart illustrating a series of processes for confirming a directly input fax destination according to the third embodiment.

Reference numeral 1300 of FIG. 12 denotes an example of a destination re-entry screen that does not require the user to re-designate a connection target. Although a destination re-entry pop-up screen 1301 includes, similarly to FIGS. 6 and 10, a fax number re-entry region, neither a communication mode re-designation pull-down menu 606, nor the function to request the user to re-designate a connection target, such as the transmission line re-designation pull-down menu 1101 is provided.

Reference numeral 1400 of FIG. 12 denotes an example of a management screen for managing IP fax communication modes that are available in the facsimile apparatus. On an IP fax communication mode management screen 1401 of the screen 1400, selection buttons 1402 with respect to the uses of the corresponding IP fax communication modes are displayed, with which it is settable whether "to use" or "not to use" NGN, VoIP GW, and Intranet, respectively. That is to say, here, it is possible to set whether or not to permit the uses of the respective communication networks (communication modes). The screen 1400 shows that all the NGN, VoIP GW, and Intranet are set to be "used", and the corresponding buttons are highlighted. According to the present embodiment, the multi-function peripheral 100 is connected to a public telephone line and an IP network, and also has an IP fax transmission property with respect to NGN, VoIP GW, and Intranet, but which communication mode is actually designated to be used depends on the settings that are configured on the IP fax communication mode management screen 1401.

Processing Procedure Hereinafter, processing for confirming a directly input fax destination according to the present embodiment will be described with reference to FIG. 13. The control program according to the processing flow is stored in the memory 109, and is executed by the CPU 108.

Accepting a Fax Destination

In step S1501, the UI control unit 201 accepts a fax number that the user has input by operating the numerical keypad 402 provided on the operation unit 105. Subsequently, in step S1502, the UI control unit 201 accepts a communication mode that the user has selected using the communication mode designation pull-down menu 603 of the fax basic screen in order to instruct the connection to a desired communication network. In the present embodiment, the user can designate the communication mode "G3", "NGN", "VoIP GW", or "Intranet". Then, in step S1503, the UI control unit 201 detects that the user has pressed the start key 403, and accepts a transmission instruction.

Determination of Property to Connect to Extension and External Lines Subsequently, in step S1504, the UI control unit 201 determines whether or not the multi-function peripheral 100 can perform fax transmission to both extension and external line networks with reference to the settings configured on the IP fax communication mode management screen 1401. In the configuration of the present embodiment, only the Intranet refers to the transmission to the extension line network. Accordingly, if the settings are such that the Intranet and other communication mode are used, it is determined that the multi-function peripheral 100 can perform fax transmission to both the extension and external line networks. If the settings are such that the Intranet is not used but other communication mode is used, it is determined that the multi-function peripheral 100 can perform fax transmission only to the external line. Furthermore, if the settings are such that only the Intranet is used, it is determined that the multi-function peripheral 100 can perform fax transmission only to the extension line network.

Re-Confirmation of the Fax Destination with Input of a Connection Target

If the result of the determination in step S1504 is Yes, the procedure advances to step S1505, where the UI control unit 201 re-confirms the fax destination together with the instruction of the communication network serving as a connection target. Specifically, the UI control unit 201 displays, on the operation unit 105, the destination re-entry screen 604 that requires the user to re-enter the fax number, and to re-designate the connection target (communication mode). In the present embodiment, since a connection target is designated with a communication mode, re-designation of a connection target is re-designation of a communication mode.

Next, in step S1506, the UI control unit 201 accepts a re-entered fax number that the user has input to the fax number re-entry region 605, and accepts, in step S1507, a re-designated communication mode that the user has re-designated using the communication mode re-designation pull-down menu 606. In step S1508, the UI control unit 201 compares the first input information accepted in steps S1501 and S1502 with the re-entered information accepted in steps S1506 and S1507. Furthermore, the UI control unit 201 determines whether or not the fax number accepted in step S1501 and the re-entered fax number accepted in step S1506 match each other, and the communication mode accepted in step S1502 and the re-designated communication mode accepted in step S1507 match each other.

If the result of the determination in step S1508 is Yes, the procedure advances to step S1509, where a transmission job is input to the job control unit 205, and then ends. Specifically, the job control unit 205 cooperates with the scan control unit 202, the image management unit 206, and the fax control unit 204, and transmits a document read by the scanner unit 104 to the designated destination via the network interface 106 or the facsimile interface 107. On the other hand, if the result of the determination in step S1508 is No, the procedure advances to step S1513, where the UI control unit 201 displays the error pop-up screen 701, and then returns to step S1504.

Re-Confirmation of the Fax Destination without Re-Designation of a Connection Target On the other hand, if the result of the determination in step S1504 is No, only the fax number is re-confirmed. In step S1510, the UI control unit 201 displays, on the operation unit 105, the destination re-entry pop-up screen 1301 that requires the user to re-enter only the fax number. Subsequently, in step S1511, the UI control unit 201 accepts a re-entered fax number that the user has input to the fax number re-entry region 1302. Subsequently, in step S1512, the UI control unit 201 compares the first input information accepted in step S1501 with the re-entered information accepted in step S1511. Furthermore, the UI control unit 201 determines whether or not the fax number accepted in step S1501 and the re-entered fax number accepted in step S1510 match each other. If the result of the determination in step S1512 is Yes, the procedure advances to step S1509, where fax transmission to the designated destination is performed, and then ends. On the other hand, if the result of the determination in step S1512 is No, the procedure advances to step S1513, where the UI control unit 201 displays the error pop-up screen 701, and then returns to step S1504.

As described above, the present embodiment has described an example of the apparatus that selects, with a communication mode, a communication network to connect to. However, as with the above-described second embodiment, the present invention may also be applicable to an apparatus that has a plurality of telephone lines connected to extension and external line networks within the same communication mode, and can select one from among the transmission lines. In this case, the determination in step S1504 is performed with reference to a value and the like of a switch indicating that transmission to both the extension and external line networks is possible. Therefore, according to the present embodiment, it is possible to provide a user-friendly operation system by reducing unnecessary re-designation of a communication mode or a communication line in the first and second embodiments.

Fourth Embodiment

Figure 14:
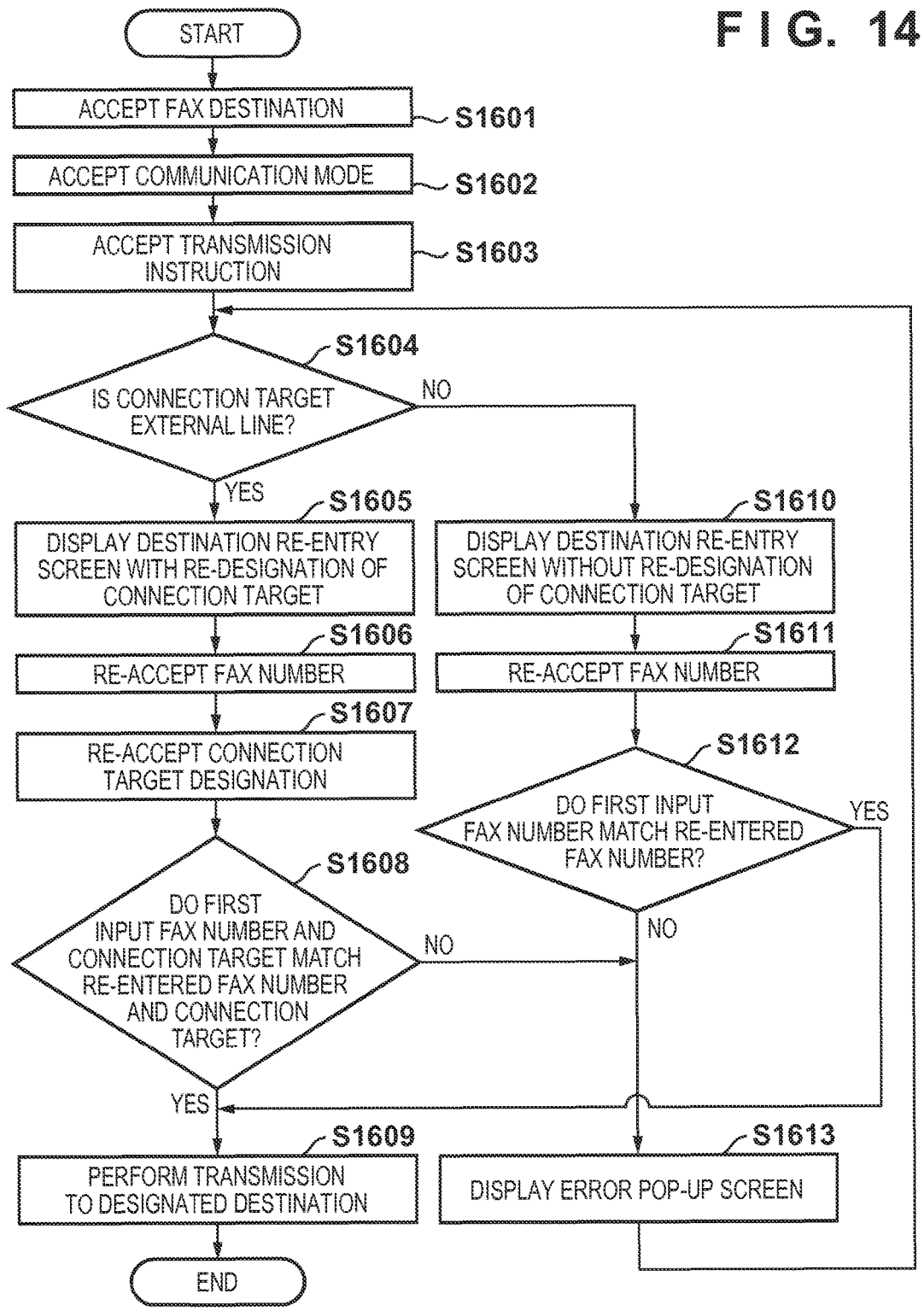
FIG. 14 is a flowchart illustrating a series of processes for confirming a directly input fax destination according to a fourth embodiment.

Hereinafter, a fourth embodiment of the present invention will be described with reference to FIG. 14. Generally, information leakage is more likely to occur when a document to be transmitted internally is transmitted externally by mistake, than when a document to be transmitted externally is transmitted internally by mistake.

Even if the multi-function peripheral 100 to which the present invention is applicable can perform transmission both to extension and external line networks, the risk of information leakage is low if the user selects the connection to the extension line network at the time of transmission. If a user who almost always performs transmission to the extension line network is requested to re-designate a communication network to connect to, as well as a telephone number, operability of fax transmission will be reduced. In the present embodiment, the multi-function peripheral 100 is connected to a public telephone line and an IP network, and can perform G3 fax transmission with respect to the public telephone line, and IP fax transmission with respect to the NGN, the VoIP GW, and the Intranet. Therefore, the present embodiment will describe control for reducing such operation troublesome for the user as much as possible.

Processing Procedure Processing for confirming a directly input fax destination according to the present embodiment will be described with reference to FIG. 14. The control program according to the processing flow is stored in the memory 109, and is executed by the CPU 108. Note that many processes in the flowchart of FIG. 14 are similar to those in the flowchart of FIG. 13, and thus only differences therebetween are described here.

Accepting a Fax Destination

The procedures in steps S1601, S1602, and S1603 are the same as the respective procedures in steps S1501, S1502, and S1503.

Confirmation of a Communication Network Serving as a Connection Target

Subsequently, in step S1604, the UI control unit 201 determines whether or not the communication network selected by the user is an external line with reference to the communication mode accepted in step S1603. In the configuration of the present embodiment, it is determined that the communication network is an external line, if the communication mode is the G3, NGN, or VoIP GW, whereas it is determined that the communication network is an extension line network, if the communication mode is the Intranet.

Re-Confirmation of the Fax Destination with Re-Designation of a Connection Target If the result of the determination in step S1604 is Yes, e.g., if the communication mode is the NGN, the communication network selected by the user is an external line. Therefore, the procedure advances to step S1605, where the fax destination, together with the instruction of the communication network serving as a connection target, are re-confirmed. The procedures in steps S1605, S1606, S1607, and S1608 are the same as the respective procedures in steps S1505, S1506, S1507, and S1508.

If the result of the determination in step S1608 is Yes, the procedure advances to step S1609, where the UI control unit 201 inputs a transmission job to the job control unit 205. The procedure in step S1609 is the same as that in step S1509. On the other hand, if the result of the determination in step S1608 is No, the procedure advances to step S1613, where the UI control unit 201 displays the error pop-up screen 701, and then returns to step S1604.

Re-Confirmation of the Fax Destination without Re-Designation of a Connection Target On the other hand, if the result of the determination in step S1604 is No, the communication network selected by the user is an extension line network. Therefore, the procedure advances to step S1610, where only the fax number is re-confirmed. The procedures in steps S1610, S1611, and S1612 are the same as the respective procedures in steps S1510, S1511, and S1512.

As described above, the present embodiment has described an example of the apparatus that selects, with a communication mode, a communication network to connect to. However, the present invention may also be applicable to an apparatus that can instruct transmission to an external line in response to a dedicated button being pressed, and an apparatus that has a plurality of telephone lines connected to extension and external line networks, and can select one from among the transmission lines. In this case, the determination in step S1604 of whether or not a connection target is an external line is performed by determining whether or not the dedicated button has been pressed or the external line has been selected. Furthermore, in steps S1607, a button is pressed again and re-designation of a transmission line is accepted, and in S1608, it is determined whether or not the re-entered information matches the first input information.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-148832 filed on Jul. 17, 2013, which is hereby incorporated by reference herein in its entirety.

What is claimed is:

1. A facsimile apparatus constructed for execution of IP facsimile transmission to any one of a plurality of networks, the plurality of networks including at least one intranet IP network and at least one public network and further constructed for execution of G3 facsimile transmission to the public network, the facsimile apparatus comprising:
a memory storing instructions, and
a processor executing the instructions causing the facsimile apparatus to:
perform a setting, for each communication mode of the IP facsimile transmission, whether or not to permit a usage of the communication mode;
accept, from a user, a first transmission destination of facsimile transmission and a first communication mode for performing the facsimile transmission, wherein the first communication mode is selected from among a communication mode corresponding to the G3 facsimile transmission and one or more communication modes of the IP facsimile transmission according to the performed setting;
display, after the first transmission destination and the first communication mode have been accepted, a facsimile confirmation screen including a destination re-entry region and a communication mode re-entry region in which the communication mode corresponding to the G3 facsimile transmission is displayed as a default;
accept, from the same user, a second transmission destination via the destination re-entry region and a second communication mode via the communication mode re-entry region;
determine whether the accepted first transmission destination matches the accepted second destination;
determine whether the accepted first communication mode matches the accepted second communication mode; and
execute the facsimile transmission according to the first transmission destination and the first communication mode in accordance with determining that the first transmission destination matches the second transmission destination and the first communication mode matches the second communication mode,
wherein the instructions further cause the facsimile apparatus not to execute the facsimile transmission according to the first transmission destination and the first communication mode, in accordance with determining that the first communication mode does not match the second communication mode.

2. The facsimile apparatus according to claim 1, wherein the instructions further cause the facsimile apparatus to:
determine whether or not the setting is such that the facsimile apparatus is set for performing IP facsimile transmission to both an extension line network and an external line network,
wherein, if the setting is such that the IP facsimile apparatus is set for performing IP facsimile transmission only to either the extension line network or the external line network:
the second transmission destination is accepted from the user without accepting the second communication mode, and
the IP facsimile transmission is executed in accordance with only determining that the first transmission destination matches the second transmission destination.

3. The facsimile apparatus according to claim 2, wherein the instructions further cause the facsimile apparatus to judge whether or not the first transmission destination is a destination in the extension line network,
wherein, if the first transmission destination is a destination in the extension line network:
the second transmission destination is accepted from the user without accepting the second communication mode, and
the IP facsimile transmission is executed in accordance with only determining that the first transmission destination matches the second transmission destination.

4. The facsimile apparatus according to claim 2, wherein the communication mode is at least one of NGN as the external line network, VoIP GW as the external line network, and Intranet as the extension line network.

5. The facsimile apparatus according to claim 1, wherein the instructions further cause the facsimile apparatus to accept a start instruction for starting the facsimile transmission,
wherein, after the first transmission destination and the first communication mode have been accepted and after the start instruction has been accepted, the second transmission destination and the second communication mode are accepted.

6. The facsimile apparatus according to claim 5, wherein the instructions further cause the facsimile apparatus to display a screen for accepting the second transmission destination and the second communication mode in accordance with the accepting of the start instruction,
wherein the second transmission destination and the second communication mode are accepted via the screen.

7. The facsimile apparatus according to claim 1, wherein the intranet IP network comprises an extension line network that uses IP-PBX.

8. A method for controlling a facsimile apparatus which is constructed for execution of IP facsimile transmission to any one of a plurality of networks, the plurality of networks including at least one intranet IP network and at least one public network and further constructed for execution of G3 facsimile transmission to the public network, the method comprising:
performing a setting, for each communication mode of the IP facsimile transmission, whether or not to permit a usage of the communication mode;
accepting, from a user, a first transmission destination of facsimile transmission and a first communication mode for performing the facsimile transmission, wherein the first communication mode is selected from among a communication mode corresponding to the G3 facsimile transmission and one or more communication modes of the IP facsimile transmission according to the performed setting;
displaying, after the first transmission destination and the first communication mode have been accepted, a facsimile confirmation screen including a destination re-entry region and a communication mode re-entry region in which the communication mode corresponding to the G3 facsimile transmission is displayed as a default;
accepting, from the same user, a second transmission destination via the destination re-entry region and a second communication mode via the communication mode re-entry region;
determining whether the accepted first transmission destination matches the accepted second destination;
determining whether the accepted first communication mode matches the accepted second communication mode; and
executing the facsimile transmission according to the first transmission destination and the first communication mode in accordance with determining that the first transmission destination matches the second transmission destination and the first communication mode matches the second communication mode,
wherein the facsimile transmission according to the first transmission destination and the first communication mode is not executed, in accordance with determining that the first communication mode does not match the second communication mode.

9. A non-transitory computer-readable storage medium storing a computer program for causing a computer to perform a control method for controlling a facsimile apparatus which is constructed for execution of IP facsimile transmission to any one of a plurality of networks, the plurality of networks including at least one intranet IP network and at least one public network and further constructed for execution of G3 facsimile transmission to the public network, the control method comprising:
performing a setting, for each communication mode of the IP facsimile transmission, whether or not to permit a usage of the communication mode;
accepting, from a user, a first transmission destination of facsimile transmission and a first communication mode for performing the facsimile transmission, wherein the first communication mode is selected from among a communication mode corresponding to the G3 facsimile transmission and one or more communication modes of the IP facsimile transmission according to the performed setting;
displaying, after the first transmission destination and the first communication mode have been accepted, a facsimile confirmation screen including a destination re-entry region and a communication mode re-entry region in which the communication mode corresponding to the G3 facsimile transmission is displayed as a default;
accepting, from the same user, a second transmission destination via the destination re-entry region and a second communication mode via the communication mode re-entry region;
determining whether the accepted first transmission destination matches the accepted second destination;

determining whether the accepted first communication mode matches the accepted second communication mode; and executing the facsimile transmission according to the first transmission destination and the first communication mode in accordance with determining that the first transmission destination matches the second transmission destination and the first communication mode matches the second communication mode, wherein the facsimile transmission according to the first transmission destination and the first communication mode is not executed, in accordance with determining that the first communication mode does not match the second communication mode.

* * * * *